United States Patent [19]

Shay et al.

[11] Patent Number: 5,478,602

[45] Date of Patent: Dec. 26, 1995

[54] POLYMERS CONTAINING MACROMONOMERS AND THEIR USE IN A METHOD OF COATING SUBSTRATES

[75] Inventors: Gregory D. Shay; Richard D. Jenkins; David R. Bassett, all of Cary, N.C.

[73] Assignee: Union Carbide Chemicals & Plastics Technology Corporation, Danbury, Conn.

[21] Appl. No.: 417,641

[22] Filed: Apr. 5, 1995

Related U.S. Application Data

[60] Continuation-in-part of Ser. No. 251,588, May 31, 1994, Pat. No. 5,405,900, which is a division of Ser. No. 163,487, Dec. 7, 1993, Pat. No. 5,342,883, which is a division of Ser. No. 887,647, May 29, 1992, Pat. No. 5,292,843.

[51] Int. Cl.$^6$ .................................................. B05D 3/02
[52] U.S. Cl. .................. 427/389; 427/389.9; 427/391; 427/393.5
[58] Field of Search ................................ 427/389, 389.9, 427/391, 393.5

[56] References Cited

U.S. PATENT DOCUMENTS

| Re. 33,156 | 1/1990 | Shay et al. | 526/301 |
|---|---|---|---|
| 3,652,497 | 3/1972 | Junas et al. | 260/47 |
| 3,894,980 | 7/1975 | DeTommaso | 260/29.6 |
| 4,079,028 | 3/1978 | Emmons et al. | 260/29.6 |
| 4,138,381 | 2/1979 | Chang et al. | 260/29.6 |
| 4,155,892 | 5/1979 | Emmons et al. | 260/29.2 |
| 4,230,844 | 10/1980 | Chang et al. | 526/210 |
| 4,338,239 | 7/1982 | Dammann | 524/549 |
| 4,384,096 | 5/1983 | Sonnabend | 526/313 |
| 4,421,902 | 12/1983 | Chang et al. | 526/317 |
| 4,423,199 | 12/1983 | Chang et al. | 526/307 |
| 4,429,097 | 1/1984 | Chang et al. | 526/317 |
| 4,496,708 | 1/1985 | Dehm et al. | 528/76 |
| 4,514,552 | 4/1985 | Shay et al. | 526/301 |
| 4,569,965 | 2/1986 | Engel et al. | 524/544 |
| 4,600,761 | 7/1986 | Ruffner et al. | 526/270 |
| 4,616,074 | 10/1986 | Ruffner | 526/318 |
| 4,703,080 | 10/1987 | Shay et al. | 524/555 |
| 4,722,962 | 2/1988 | Shay et al. | 524/548 |
| 5,023,309 | 6/1991 | Kruse et al. | 528/49 |
| 5,292,843 | 3/1994 | Jenkins et al. | |
| 5,342,883 | 8/1994 | Jenkins et al. | |
| 5,405,900 | 4/1995 | Jenkins et al. | |

OTHER PUBLICATIONS

Jenkins, R. D. et al., Associative Polymers with Novel Hydrophobe Structures, ACS Meeting, New York, N.Y., Aug. 26, 1991.

*Primary Examiner*—Joseph L. Schofer
*Assistant Examiner*—N. Sarofin
*Attorney, Agent, or Firm*—R. M. Allen

[57] ABSTRACT

This invention relates to a method of coating a substrate by applying thereon an aqueous coating composition containing an alkali-swellable complex hydrophobe associative thickener. When a blade coater is utilized to apply said composition, lower blade pressures are obtained allowing increased line speeds to be used without scratching the substrate.

15 Claims, No Drawings

POLYMERS CONTAINING MACROMONOMERS AND THEIR USE IN A METHOD OF COATING SUBSTRATES

This application is a continuation-in-part of U.S. patent application Ser. No. 08/251,588, filed May 31, 1994, now U.S. Pat. No. 5,405,900 which is a divisional of U.S. patent application Ser. No. 08/163,487, filed Dec. 7, 1993 (now U.S. Pat. No. 5,342,883), which is a divisional of U.S. patent application Ser. No. 07/887,647, filed May 29, 1992 (now U.S. Pat. No. 5,292,843).

BRIEF SUMMARY OF THE INVENTION

1. Technical Field

This invention relates to polymers which are soluble in, or swelled by, an aqueous alkaline medium to provide thickeners for use in aqueous coating compositions, and the use of such compositions in a method of coating substrates.

2. Background of the Invention

Thickeners for aqueous systems are needed for various purposes, such as for architectural coatings, industrial coatings, automotive coatings and the like to improve rheology of the coatings. Hydroxyethyl cellulose is a well known thickener for aqueous systems, but it has various deficiencies in that excessive amounts must be used and the rheology of the thickened system is inadequate. Various ethoxylated carboxyl-functional polymers which form alkali soluble thickeners are also known, but these have various deficiencies, including inadequate hydrolytic stability.

Conventional (non-associative) thickeners can be added to attempt to solve these problems but coating compositions containing such thickeners also have processing problems. For example, conventional thickener-containing compositions can have a high extensional viscosity which causes misting/spattering or pattern formation that can ruin the coated substrate.

The high extensional viscosity may also result in high blade pressure when the conventional thickener-containing composition is applied by a blade coater. High blade pressure requires a slower line speed or results in paper breaks and/or scratching of the substrate. Furthermore, high blade pressure can undesirably force water and coating from the substrate.

Non-ionic associative thickener-containing compositions also exhibit low extensional viscosity, but because they are lower in molecular weight they are absorbed into the substrate and thus do not remain on the surface to improve it.

It has long been desired to provide superior thickeners for aqueous systems which are highly efficient, which better resist hydrolysis, and which provide better rheology when used in a method of coating substrates. This is achieved herein by providing a method of coating substrates using new polymers which possess these desired characteristics.

DISCLOSURE OF THE INVENTION

This invention relates in part to a method of coating substrates by applying thereon an aqueous coating comprising an alkali-swellable complex hydrophobe associative thickener, said complex hydrophobe associative thickener being prepared by polymerizing monomers comprising:

(a) about 1–99.9, preferably about 10–70, weight percent of one or more alpha, beta-monoethylenically unsaturated carboxylic acids, typically methacrylic acid;

(b) about 0–98.9, preferably about 30–85, weight percent of one or more monoethylenically unsaturated monomers, typically ethyl acrylate;

(c) about 0.1–99, preferably about 5–60, weight percent of one or more complex hydrophobe-containing monoethylenically unsaturated macromonomers; and (d) about 0–20, preferably about 0–10, weight percent or greater of one or more polyethylenically unsaturated monomers, typically trimethylol propane triacrylate.

Compositions containing these complex hydrophobe associative thickeners generally have a relatively low extensional viscosity which is believed to result in improved transfer and reduced webbing, misting/spattering and pattern formation of the coating composition and the ability to utilize a low blade pressure when a blade coater is utilized to apply the composition.

The preferred complex hydrophobe associative thickeners for use in aqueous coating compositions are anionic and have a relatively high number average molecular weight thereby retaining water better than conventional hydrophobe associative thickeners. Thus, the preferred complex hydrophobe associative thickener containing aqueous coating compositions are not absorbed into the substrate and produce improved coatings compared to conventional hydrophobe associative thickeners and non-associative thickeners.

DETAILED DESCRIPTION

The aqueous coating compositions of this invention can be applied to a substrate capable of receiving the coating compositions by conventional coating techniques such as blade, roll, curtain, air knife, spray, etc. After the composition is applied, it is cured using heat to remove the water which results in coagulation that produces a cured coating.

Representative substrates include paper, e.g., paper made from vegetation and/or plastic, cardboard, films, e.g., polyethylene films and Mylar® films, yarns, fabrics, leather and the like. Preferred substrates are selected from the group consisting of paper, cardboard, films, yarns, fabrics and leather. Paper coated with the cured coating compositions can be utilized as newsprint stock, packaging material, wallpaper stock, printers stock, and the like.

Aqueous coating compositions for coating substrates typically include an elastomer, thickener, pigment, filler, binder, and water. Preferably the elastomer is a latex such as a styrene-butadiene latex. The aqueous composition can produce a non-adhesive, water-activated adhesive or pressure activated adhesive coating. Optional ingredients include dispersants, defoamers and others, as is known in the art.

The thickeners used in the method of the present invention are complex hydrophobe associative thickeners prepared by polymerizing monomers comprising:

(a) about 1–99.9, preferably about 10–70, weight percent of one or more alpha, beta-monoethylenically unsaturated carboxylic acids, such as methacrylic acid;

(b) about 0–98.9, preferably about 30–85, weight percent of one or more monoethylenically unsaturated monomers, such as ethyl acrylate;

(c) about 0.1–99, preferably about 5–60, weight percent of one or more complex hydrophobe-containing monoethylenically unsaturated macromonomers; and (d) about 0–20, preferably about 0–10, weight percent or greater of one or more polyethylenically unsaturated monomers, typically trimethylol propane triacrylate.

A large proportion of one or more alpha, beta-monoethylenically unsaturated carboxylic acid monomers can be present in the polymers of this invention. Various carboxylic acid monomers can be used, such as acrylic acid, methacrylic acid, ethacrylic acid, alpha-chloroacrylic acid, crotonic acid, fumaric acid, citraconic acid, mesaconic acid, itaconic acid, maleic acid and the like including mixtures thereof. Methacrylic acid is preferred. A large proportion of carboxylic acid monomer is essential to provide a polymeric structure which will solubilize and provide a thickener when reacted with an alkali like sodium hydroxide.

The polymers of this invention can also contain a significant proportion of one or more monoethylenically unsaturated monomers. The preferred monomers provide water insoluble polymers when homopolymerized and are illustrated by acrylate and methacrylate esters, such as ethyl acrylate, butyl acrylate or the corresponding methacrylate. Other monomers which can be used are styrene, alkyl styrenes, vinyl toluene, vinyl acetate, vinyl alcohol, acrylonitrile, vinylidene chloride, vinyl ketones and the like. Nonreactive monomers are preferred, those being monomers in which the single ethylenic group is the only group reactive under the conditions of polymerization. However, monomers which include groups reactive under baking conditions or with divalent metal ions such as zinc oxide may be used in some situations, like hydroxyethyl acrylate.

Other illustrative monoethylenically unsaturated monomers useful in this invention include, for example, propyl methacrylate, isopropyl methacrylate, butyl methacrylate, n-amyl methacrylate, sec-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, vinyl propionate, vinyl butyrate, vinyl tert-butyrate, vinyl caprate, vinyl stearate, vinyl laurate, vinyl oleate, vinyl methyl ether, vinyl ethyl ether, vinyl n-propyl ether, vinyl iso-propyl ether, vinyl n-butyl ether, vinyl iso-butyl ether, vinyl iso-octyl ether, vinyl phenyl ether, a-chlorovinyl phenyl ether, vinyl β-naphthyl ether, methacryonitrile, acrylamide, methacrylamide, N-alkyl acrylamides, N-aryl acrylamides, N-vinyl pyrrolidone, N-vinyl-3-morpholinones, N-vinyl-oxazolidone, N-vinyl-imidazole and the like including mixtures thereof.

The complex hydrophobe-containing macromonomers useful in this invention can be represented by the formula:

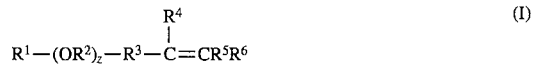

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

The macromonomer compounds useful in this invention can be prepared by a number of conventional processes, except for inclusion of the complex hydrophobe compounds described herein. Illustrative processes are described, for example, in U.S. Pat. Nos. 4,514,552, 4,600,761, 4,569,965, 4,384,096, 4,268,641, 4,138,381, 3,894,980, 3,896,161, 3,652,497, 4,509,949, 4,226,754, 3,915,921, 3,940,351, 3,035,004, 4,429,097, 4,421,902, 4,167,502, 4,764,554, 4,616,074, 4,464,524, 3,657,175, 4,008,202, 3,190,925, 3,794,608, 4,338,239, 4,939,283 and 3,499,876. The macromonomers can also be prepared by methods disclosed in copending U.S. patent application Ser. No. 08/887,645, which is incorporated herein by reference.

Illustrative substituted and unsubstituted divalent hydrocarbon residues represented by $R^2$ in formula I above include those described for the same type of substituents in formulae (i) and (ii) below. Illustrative substituted and unsubstituted monovalent hydrocarbon residues represented by $R^4$, $R^5$ and $R^6$ in formula I above include those described for the same type of substituents in formula (i) and (ii) below.

Illustrative $R^3$ substituents include, for example, the organic residue of ethers, esters, urethanes, amides, ureas, anhydrides and the like including mixtures thereof. The $R^3$ substituent can be generally described as a "linkage" between the complex hydrophobe bearing surfactant or alcohol, and the unsaturation portion of the macromonomer compound. Preferred linkages include the following: urethane linkages from the reaction of an isocyanate with a nonionic surfactant; urea linkages from the reaction of an isocyanate with an amine bearing surfactant; unsaturated esters of surfactants such as the esterification product of a surfactant with of an unsaturated carboxylic acid or an unsaturated anhydride; unsaturated esters of alcohols; esters of ethyl acrylate oligomers, acrylic acid oligomers, and allyl containing oligomers; half esters of surfactants such as those made by the reaction of a surfactant with maleic anhydride; unsaturated ethers prepared by reacting vinyl benzyl chloride and a surfactant or by reacting an allyl glycidyl ether with a surfactant, alcohol, or carboxylic acid.

The oxyalkylene moieties included in the macromonomer compounds (I) may be homopolymers or block or random copolymers of straight or branched alkylene oxides. Mixtures of alkylene oxides such as ethylene oxide and propylene oxide may be employed. It is understood that each $R^2$ group in a particular substituent for all positive values of z can be the same or different.

The complex hydrophobe compounds having at least one active hydrogen useful in preparing the macromonomer compounds useful in this invention can be represented by the formula:

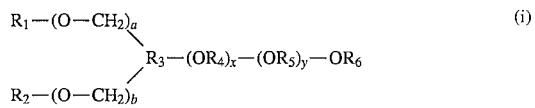

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$ $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$. For purposes of the polymers and macromonomers of formula (I) above, when z is a value of 0 and $R^1$ is the residue of a complex hydrophobe of formula (i) in which $R_1$ is hexadecyl, a is a value of 1, $R_2$ is tetradecyl, b is a value of 0, $R_3$ is CH—, $R_4$ is —CH$_2$CH(tetradecyl)—, x is a value of 1, $R_5$ is —CH$_2$CH$_2$—, y is a value of 34, $R_6$ is hydrogen, and the —$R^3$—($R^4$)C=CR$^5$R$^6$ portion of the macromonomer is the residue of maleic anhydride, then the polymers of this invention are other than a terpolymer of said macromonomer, styrene and maleic anhydride. Also for purposes of the polymers and macromonomers of formula (I) above, when $R^2$ is —CH$_2$CH$_2$—, z is a value of 34 and $R^1$ is the residue of a complex hydrophobe of formula (i) in which $R_1$ is hexadecyl, a is a value of 1, $R_2$ is tetradecyl, b is a value of 0, $R_3$ is

>CH—, $R_4$ is —CH$_2$CH(tetradecyl)—, x is a value of 1, y is a value of 0, $R_6$ is hydrogen, and the —$R^3$—($R^4$)C=CR$^5$R$^6$ portion of the macromonomer is the residue of maleic anhydride, then the polymers of this invention are other than a terpolymer of said macromonomer, styrene and maleic anhydride.

Other complex hydrophobe compounds having at least one active hydrogen useful in preparing the macromonomer compounds useful in this invention can be represented by the formula:

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

Illustrative substituted and unsubstituted monovalent hydrocarbon residues contain from 1 to about 50 carbon atoms or greater and are selected from alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, triphenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like. The permissible hydrocarbon residues may contain fluorine, silicon, or other non-carbon atoms.

Preferably, the substituted and unsubstituted hydrocarbon residues are selected from alkyl and aryl radicals which contain from about 1 to 30 carbon atoms or greater. More preferably, the alkyl radicals contain from 1 to 18 carbon atoms, while the aryl, arylalkyl, alkylaryl and cycloalkyl radicals preferably contain from 6 to 18 carbon atoms or greater.

In a preferred embodiment of this invention, $R_1$, $R_2$, $R_7$ and $R_8$ can individually be a hydrocarbon radical represented by the formula:

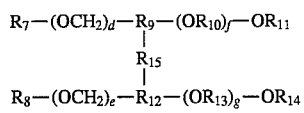

wherein $R_{16}$ and $R_{17}$ are as defined for $R_1$, $R_2$, $R_7$ and $R_8$ above, h and i are the same or different and are a value of 0 or 1, and $R_{18}$ is as defined for $R_3$ above. For compounds represented by formulae (i) and (ii), it is understood that each formula (iii) radical in a given compound may be the same or different and the $R_{16}$ and/or $R_{17}$ groups may themselves be a formula (iii) radical to provide complex hydrophobes of a dendritic or of a cascading nature as described below. Further, $R_4$, $R_5$, $R_{10}$ and $R_{13}$ can individually be a hydrocarbon radical represented by the formula:

wherein $R_{19}$ is as defined for $R_4$, $R_5$, $R_{10}$ and $R_{13}$ above, $R_{20}$ is as defined for $R_6$, $R_{11}$ and $R_{14}$ above, and j is a value of 0 or greater.

Illustrative ionic substituents for $R_6$, $R_{11}$, $R_{14}$ and $R_{20}$ include cationic and anionic substituents such as sulfates, sulfonates, phosphates and the like. $R_6$, $R_{11}$, $R_{14}$ and $R_{20}$ may preferably be an organic residue containing 1 or more hydroxyls or nitrogen derivatives or epoxides or other reactive groups which may or may not contain unsaturation.

Other illustrative terminal groups which are described by $R_6$, $R_{11}$, $R_{14}$ and $R_{20}$ include, for example, hydrocarbon residues which may contain allyic or vinylic unsaturation, acrylic or methacrylic functionality, styryl or alpha-methylstyryl functionality, and the like, such as the reaction product between the terminal alcohol ($R_6$, $R_{11}$, $R_{14}$ and $R_{20}$=H) and glycidyl methacrylate, isocyanatoethyl methacrylate, alpha, alpha-dimethyl-m-isopropenyl benzyl isocyanate (m-TMI), and the like. Other examples of terminal groups may include hydrocarbon residues of alkyl, aryl, aralkyl, alkaryl, and cycloalkyl radicals which may or may not be substituted with one or more of the following: hydroxyl, carboxyl, isocyanato, amino, mono- or disubstituted amino, quaternary ammonium, sulfate, sulfonate, phosphate, epoxy, and the like and may or may not contain other non-carbon atoms including silicon or fluorine. Also included can be divalent siloxy radicals. Other nonhydrocarbon terminal groups may include sulfates, phosphates, and the like.

Illustrative divalent hydrocarbon residues represented by $R_3$, $R_4$, $R_5$, $R_9$, $R_{10}$, $R_{12}$, $R_{13}$, $R_{15}$, $R_{18}$ and $R_{19}$ in the above formulae include substituted and unsubstituted radicals selected from alkylene, -alkylene-oxy-alkylene-, -arylene-oxy-arylene-, arylene, alicyclic radicals, phenylene, naphthylene,-phenylene(CH$_2$)$_m$(Q)$_n$(CH$_2$)$_m$-phenylene- and -naphthylene-(CH$_2$)$_m$ (Q)$_n$(CH$_2$)$_m$-naphthylene- radicals, wherein Q individually represents a substituted or unsubstituted divalent bridging group selected from —CR$_{21}$R$_{22}$—, —O—, —S—, —NR$_{23}$—, —SiR$_{24}$R$_{25}$— and —CO—, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1. More specific illustrative divalent radicals represented by $R_3$, $R_4$, $R_5$, $R_9$, $R_{10}$, $R_{12}$, $R_{13}$, $R_{15}$, $R_{18}$ and $R_{19}$ include, e.g., 1,1-methylene, 1,2-ethylene, 1,3-propylene, 1,6-hexylene, 1,8-octylene, 1,12-dodecylene, 1,4-phenylene, 1,8-napthylene, 1,1'-biphenyl-2,2'-diyl, 1,1'-binaphthyl-2,2'-diyl, 2,2'-binaphthyl-1,1'-diyl and the like. The alkylene radicals may contain from 2 to 12 carbon atoms or greater, while the arylene radicals may contain from 6 to 18 carbon atoms or greater. Preferably, $R_3$, $R_4$, $R_5$, $R_9$, $R_{10}$, $R_{12}$, $R_{13}$, $R_{15}$, $R_{18}$ and $R_{19}$ are an alkylene or arylene radical. The permissible divalent hydrocarbon residues may contain fluorine, silicon, or other non-carbon atoms.

Illustrative trivalent hydrocarbon residues represented by $R_3$, $R_9$, $R_{12}$ and $R_{18}$ in the above formulae include substituted and unsubstituted radicals selected from

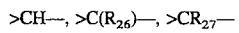

and the like, wherein $R_{26}$ is a substituted or unsubstituted monovalent hydrocarbon residue as described herein and $R_{27}$ is a substituted or unsubstituted divalent hydrocarbon residue as described herein.

Of course, it is to be further understood that the hydrocarbon residues in the above formulae may also be substituted with any permissible substituent. Illustrative substituents include radicals containing from 1 to 18 carbon atoms such as alkyl, aryl, aralkyl, alkaryl and cycloalkyl radicals; alkoxy radicals; silyl radicals such as —Si$(R_{28})_3$ and —Si$(OR_{28})_3$, amino radicals such as —N$(R_{28})_2$; acyl radicals such as —C(O)$R_{28}$; acyloxy radicals such as —OC(O)$R_{28}$; carbonyloxy radicals such as —COO$R_{28}$; amido radicals such as —C(O)N$(R_{28})_2$ and —N$(R_{28})$CO$R_{28}$; sulfonyl radicals such as —SO$_2R_{28}$; sulfinyl radicals such as —SO$(R_{28})_2$; thionyl radicals such as —S$R_{28}$; phosphonyl radicals such as —P(O)$(R_{28})_2$; as well as halogen, nitro, cyano, trifluoromethyl and hydroxy radicals and the like, wherein each $R_{28}$ can be a monovalent hydrocarbon radical such as alkyl, aryl, alkaryl, aralkyl and cycloalkyl radicals, with the provisos that in amino substituents such as —N$(R_{28})_2$, each $R_{28}$ taken together can also compromise a divalent bridging group that forms a heterocyclic radical with the nitrogen atom, in amido substituents such as —C(O)N$(R_{28})_2$ and —N$(R_{28})$CO$R_{28}$, each $R_{28}$ bonded to N can also be hydrogen, and in phosphonyl substituents such as —P(O)$(R_{28})_2$, one $R_{28}$ can by hydrogen. It is to be understood that each $R_{28}$ group in a particular substituent may be the same or different. Such hydrocarbon substituent radicals could possibly in turn be substituted with a permissible substituent such as already herein outlined above.

Preferred alkylene oxides which can provide random or block oxyalkylene units in the complex hydrophobe compounds represented by formulae (i) and (ii) include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, 1,2-decylene oxide, and higher alpha-olefin epoxides; epoxidized fatty alcohols such as epoxidized soybean fatty alcohols and epoxidized linseed fatty alcohols; aromatic epoxides such as styrene oxide and 2-methylstyrene oxide; and hydroxy- and halogen-substituted alkylene oxides such as glycidol, epichlorohydrin and epibromohydrin. The preferred alkylene oxides are ethylene oxide and propylene oxide. Also included can be hydrocarbon residues from substituted and unsubstituted cyclic esters or ethers such as oxetane and tetrahydrofuran. It is understood that the compounds represented by formulae (i) and (ii) herein can contain random and/or block oxyalkylene units as well as mixtures of oxyalkylene units. It is further understood that each $R_4$, $R_5$, $R_{10}$, $R_{13}$ and $R_{19}$ group in a particular substituent for all positive values of x, y, f, g and j respectively can be the same or different.

The values of x, y, z, f, g and j are not narrowly critical and can vary over a wide range. For example, the values of x, y, z, f, g and j can range from 0 to about 200 or greater, preferably from about 0 to about 100 or greater, and more preferably from about 0 to about 50 or greater. Any desired amount of alkylene oxide can be employed, for example, from 0 to about 90 weight percent or greater based on the weight of the complex hydrophobe compound.

Referring to the general formulae (i) and (ii) above, it is appreciated that when $R_1$, $R_2$, $R_7$ and/or $R_8$ are a hydrocarbon residue of formulae (iii) above, the resulting compound may include any permissible number and combination of hydrophobic groups of the dendritic or cascading type. Such compounds included in the above general formulae should be easily ascertainable by one skilled in the art. Illustrative complex hydrophobe compounds having at least one active hydrogen useful in this invention and processes for preparation thereof are disclosed in copending U.S. patent application Ser. No. 08/887,648, which is incorporated herein by reference.

In a preferred embodiment of this invention, the structure shown in formula (iii) can be a residue of the reaction product between epichlorohydrin and an alcohol, including those alcohols whose residues can be described by formula (iii), or a phenolic, or a mixture thereof. The structures which result can be described as complex hydrophobes of a dendritic or of a cascading nature. Pictorially, they can be described as shown below:

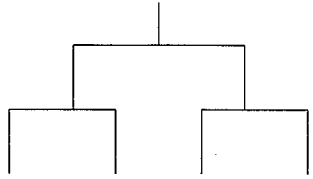

Preferred macromonomer compounds useful in this invention include those represented by the formulae:

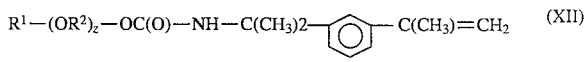

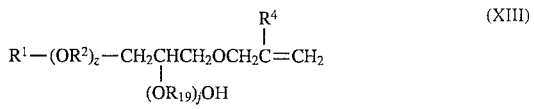

and

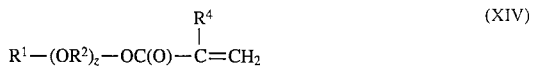

wherein $R^1$, $R^2$, $R^4$, $R_{19}$, z and j are as defined herein.

The macromonomer compounds useful in this invention can undergo further reaction(s) to afford desired derivatives thereof. Such permissible derivatization reactions can be carried out in accordance with conventional procedures known in the art. Illustrative derivatization reactions include, for example, esterification, etherification, alkoxylation, amination, alkylation, hydrogenation, dehydrogenation, reduction, acylation, condensation, carboxylation, oxidation, silylation and the like, including permissible combinations thereof. This invention is not intended to be limited in any manner by the permissible derivatization reactions or permissible derivatives of macromonomer compounds.

More particularly, the hydroxyl-terminated macromonomer compounds of this invention can undergo any of the known reactions of hydroxyl groups illustrative of which are reactions with acyl halides to form esters; with ammonia, a nitrile, or hydrogen cyanide to form amines; with alkyl acid sulfates to form disulfates; with carboxylic acids and acid anhydrides to form esters and polyesters; with alkali metals to form salts; with ketenes to form esters; with acid anhydrides to form carboxylic acids; with oxygen to form aldehydes and carboxylic acids; ring-opening reactions with lactones, tetrahydrothran; dehydrogenation to form aldehydes, isocyanates to form urethanes, and the like.

The monoethylenically unsaturated macromonomer component is subject to considerably variation within the formula presented previously. The essence of the macromonomer is a complex hydrophobe carrying a polyethoxylate chain (which may include some polypropoxylate groups) and which is terminated with at least one hydroxy group. When the hydroxy-terminated polyethoxylate complex hydrophobe used herein is reacted with a monoethylenically unsaturated monoisocyanate, for example, the result is a monoethylenically unsaturated urethane in which a complex hydrophobe polyethoxylate structure is associated with a copolymerizable monoethylenic group via a urethane linkage.

The monoethylenically unsaturated compound used to provide the monoethylenically unsaturated macromonomer is subject to wide variation. Any copolymerizable unsaturation may be employed, such as acrylate and methacrylate unsaturation. One may also use allylic unsaturation, as provided by allyl alcohol. These, preferably in the form of a hydroxy-functional derivative, as is obtained by reacting a $C_2$–$C_4$ monoepoxide, like ethylene oxide, propylene oxide or butylene oxide, with acrylic or methacrylic acid to form an hydroxy ester, are reacted in equimolar proportions with an organic compound, such as toluene diisocyanate or isophorone diisocyanate. The preferred monoethylenic monoisocyanate is styryl, as in alpha, alpha-dimethyl-m-isopropenyl benzyl isocyanate. Other suitable organic compounds include, for example, monoethylenically unsaturated esters, ethers, amides, ureas, anhydrides, other urethanes and the like.

The polymers of this invention can be prepared via a variety of polymerization techniques known to those skilled in the art. The technique of polymerization influences the microstructure, monomer sequence distribution in the polymer backbone and its molecular weight to influence the performance of the polymer. Illustrative polymerization techniques include, for example, conventional and staged emulsion polymerization via batch, semi-continuous, or continuous processes, micellar polymerization, inverse emulsion polymerization, solution polymerization, non-aqueous dispersion polymerization, interfacial polymerization, emulsion polymerization, suspension polymerization, precipitation polymerization, addition polymerizations such as free radical, anionic, cationic or metal coordination methods, and the like.

The thickeners of this invention possess structural attributes of two entirely different types of thickeners (those which thicken by alkali solubilization of a high molecular weight entity, and those which thicken due to association), and this may account for the superior thickener properties which are obtained herein.

The aqueous emulsion copolymerization is entirely conventional. To obtain an estimate of thickening efficiency, the product can be diluted with water to about 1% solids content and then neutralized with alkali. The usual alkali is ammonium hydroxide, but sodium and potassium hydroxide, and even amines, like triethylamine, may be used for neutralization. The neutralized product dissolves in the water to provide an increase in the viscosity. In the normal mode of addition, the unneutralized thickener, which has a lower viscosity, is added to an aqueous coating composition and then neutralized to a pH of 7 or above. This facilitates handling the thickener, even at high solids concentrations. The aqueous solutions thickened with the neutralized polymers of this invention exhibit good viscosity stability even at a pH as high as 13.

The polymers of this invention are preferably produced by conventional aqueous emulsion polymerization techniques, using appropriate emulsifiers for emulsifying the monomers and for maintaining the polymer obtained in a suitable, dispersed condition. Commonly used anionic surfactants such as sodium lauryl sulfate, dodecylbenzene sulfonate and ethoxylated fatty alcohol sulfate can be used as emulsifiers. The emulsifier may be used in a proportion of ½ to 6% of the weight monomers.

Preferably, water-soluble initiators such as alkali metal or ammonium persulfate are used in amounts from 0.01 to 1.0% on the weight of monomers. A gradual addition thermal process employed at temperatures between 60° C. to 100° C. is preferred over redox systems.

The polymerization system may contain small amounts (0.01 to 5% by weight, based on monomer weight) of the chain transfer agent mercaptans such as hydroxyethyl mercaptan, mercapto-propionic acid and alkyl mercaptans containing from about 4 to 22 carbon atoms, and the like. The use of mercaptan modifier reduces the molecular weight of the polymer and therefore its thickening efficiency.

The polymers of this invention may further be modified by introducing an amount of component (d), namely, one or more polyethylenically unsaturated copolymerizable monomers effective for crosslinking, such as diallylphthalate, divinylbenzene, allyl methacrylate, trimethylol propane triacrylate, ethyleneglycol diacrylate or dimethacrylate, 1,6-hexanediol diacrylate or dimethylacrylate, diallyl benzene, and the like. Thus, from about 0.05 or less to about 20% or greater of such polyethylenically unsaturated compound based on total weight of monomer may be included in the composition forming the polymer. The resulting polymers are either highly branched or in the form of three-dimensional networks. In the neutralized salt firm, those networks swell in an aqueous system to act as a highly efficient thickener.

Other illustrative polyethylenically unsaturated monomers useful in this invention include, for example, any copolymerizable compound which contains two or more nonconjugated points of ethylenic unsaturation or two or more nonconjugated vinylidene groups of the structure, $CH_2=C=$, such as divinyltoluene, trivinylbenzene, divinylnaphthalene, trimethylene glycol diacrylate or dimethacrylate, 2-ethylhexane-1,3-dimethylacrylate, divinylxylene, divinylethylbenzene, divinyl ether, divinyl sulfone, allyl ethers of polyhydric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N-methylenediacrylamide, N,N'-methylenedimethacrylamide, N,N'-ethylidenediacrylamide and 1,2-di-(a-methyl-methylenesulfonamide)-ethylene.

The polymer may be utilized in a variety of ways to provide the thickener or thickened compositions of this invention. For example, the polymer, while in aqueous dispersion or dry form, may be blended into an aqueous system to be thickened followed by addition of a neutralizing agent. Alternatively, the polymer may first be neutralized in aqueous dispersion form and then blended with the aqueous system. Preferably, if co-thickening by a surfactant is desired, the components are separately blended (as dry components or as dispersions or slurries) into an aqueous dispersion to be thickened, followed by the neutralization step. Although aqueous concentrates of the polymer in acid form and the surfactant may be formed and added to an aqueous dispersion to be thickened as needed, followed by neutralization, such concentrates tend to be too viscous for easy handling. It is nevertheless possible to prepare either a dry blend or an aqueous, high solids composition which is sufficiently low in viscosity as to be pumpable or pourable, and then to further thicken the admixture by addition of an alkaline material.

The polymer thickener may be provided in a dry state in number of ways. For example, the unneutralized polymer may be spray or drum dried and., if desired, blended with a surfactant co-thickener. However, it is also possible to spray dry or otherwise dehydrate the neutralized polymer thickener, and then reconstitute the aqueous thickener dispersion at a future time and place by agitation in a aqueous medium, provided the pH of the dispersion is maintained at pH 7 or higher.

The polymer may be used to thicken compositions under acidic conditions in the presence of a relatively large amount of surfactants wherein the thickened composition, for example, an aqueous system, has a pH below 7, even as low as 1.

An enhancement of thickening (herein termed "co-thickening") can result upon the addition of a surfactant to an aqueous system containing the polymer of this invention, when the polymer is neutralized. In some cases the thickening can be enhanced up to about 40 times the viscosity afforded by the neutralized polymer alone. A wide range of surfactants may be used. Although trace amounts of surfactant may be residually present from the polymerization of the monomers comprising the polymer (for example, whatever may remain of the about 1.5 weight percent surfactant on monomers), such amounts of surfactant are not believed to result in any measurable co-thickening.

On the basis of an aqueous system containing about 0.1 to 5% by weight of polymer solids, a useful amount of surfactant for optimum co-thickening is about 0.1 to 1.0% by weight of the total system. As indicated, the amounts of polymer and surfactant co-thickener may vary widely, even outside these ranges, depending on polymer and surfactant type and other components of the aqueous system to be thickened. However, the co-thickening can reach a maximum as surfactant is added and then decreases as more surfactant is added. Hence, it may be uneconomical to employ surfactant in amounts outside the stated concentrations and polymer/surfactant ratios, but this can be determined in a routine manner in each case.

The preferred method of application of the polymer and the surfactant for aqueous thickening is to add in any sequence the polymer and the surfactant to the medium to be thickened and, after mixing, to introduce an alkaline material to neutralize the acid. This method of applying polymer and surfactant to an aqueous system before neutralization enables one to handle a high solids thickener in a non-viscous state, to obtain a uniform blend, and then to convert to a highly viscous condition by the simple addition of an alkaline material to bring the pH of the system to 7 or above. However, the polymer in the aqueous system may also be neutralized before addition of the surfactant.

The surfactants which may be used include nonionics and anionics, singly or in combination, the selection necessarily depending upon compatibility with other ingredients of the thickened or thickenable dispersions of this invention. Cationic and amphoteric surfactants may also be used provided they are compatible with the polymer and other ingredients of the aqueous system, or are used in such small amounts as not to cause incompatibility.

Suitable anionic surfactants that may be used include the higher fatty alcohol sulfates such as the sodium or potassium salt of the sulfates of alcohols having from 8 to 18 carbon atoms, alkali metal salts or amine salts of high fatty acid having 8 to 18 carbon atoms, and sulfonated alkyl aryl compounds such as sodium dodecyl benzene sulfonate. Examples of nonionic surfactants include alkylphenoxypolyethoxyethanols having alkyl groups of about 7 to 18 carbon atoms and about 9 to 40 or more oxyethylene units such as octylphenoxypolyethoxyethanols, dodecylphenoxypolyethoxyethanols; ethylene oxide derivatives of long-chain carboxylic acids, such as lauric, myristic, pahnitic, oleic; ethylene oxide condensates of long-chain alcohols such as lauryl or cetyl alcohol, and the like.

Examples of cationic surfactants include lauryl pyridinium chloride, octylbenzyltrimethylammonium chloride, dodecyltrimethylammonium chloride condensates of primary fatty amines and ethylene oxide, and the like.

The foregoing and numerous other useful nonionic, anionic, cationic, and amphoteric surfactants are described in the literature, such as McCutcheon's Detergents & Emulsifiers 1981 Annual, North America Edition, MC Publishing Company, Glen Rock, N.J. 07452, U.S.A., incorporated herein by reference.

In general, solvents and non-solvents (or mixtures of solvents, non-solvents, other organics and volatiles) can be used to manipulate the viscosity of polymer containing systems. Co-thickening with mineral spirits has utility in textile printing pastes, and in waterborne automotive basecoats. These systems usually contain mineral spirits (because of the pigments used therein), so that the mineral spirits provide an economical way of increasing viscosity and improving the efficiency of the thickener.

The complex hydrophobe associative thickeners of this invention may be employed as thickeners for controlling viscosity of any aqueous based composition. The amount of the thickener that may be dissolved in any given aqueous composition may fall within a wide range depending on the particular viscosity desired. Thus, although any effective amount of the complex hydrophobe associative thickener may be employed, it is typical to use from about 0.05 to about 20%, preferably from about 0.1 to about 5%, and most preferably from about 0.1 to about 3% by weight, based on the weight of the total aqueous composition including polymer.

An aqueous based composition, as herein defined, is a composition wherein water comprises at least 10% by weight of the total composition (including 100% water). For example, aqueous dispersions, emulsions, suspensions, solutions, slurries and the like, may be thickened by the polymers of this invention.

Typical aqueous compositions include compositions to be applied to textiles such as latex adhesives, warp sizes, backings for rugs and other pile fabrics. The polymer may also be used when thickening is desired in the purification of raw water such as the saline water used in the recovery of oil from exhausted oil wells by water flooding techniques. Other aqueous coatings compositions to which the polymer can be added for thickening purposes include drilling muds, caulks, adhesives, coating compositions such as paper coatings, furniture finishes, ink compositions, latex paints, foundry core washes, and the like.

For aqueous coating compositions, the complex hydrophobe associative thickeners provide improved transfer, flow and leveling characteristics and reduced webbing, misting/spattering and pattern formation, and further enhances the properties of the coated substrate by providing higher gloss, a more uniform appearance and a superior print density as compared to substrates coated using a conventional hydrophobe associative thickener.

When a blade coater is utilized to apply the composition, lower blade pressures are obtained which allows increased line speeds to be used, without scratching the substrate. Also, lower blade pressure does not force water into substrates such as paper.

The aqueous coating compositions containing alkali-swellable complex hydrophobe associative thickeners can possess a viscosity higher than can conventionally be utilized and still achieve good transfer of the composition to the substrate. This permits an increase in the solids content of the coating composition and/or an increase in the line speed. Lower solids coatings can also be applied, if desired, by using more of the complex hydrophobe associative thickener to increase the viscosity.

Compositions containing associative thickeners generally have a relatively low extensional viscosity compared to compositions containing non-associative thickeners, which have a relatively high extensional viscosity. This difference in extensional viscosity is due to the difference in thickening mechanisms of the associative and non-associative thickeners.

Extensional viscosity is a measure of the resistance to elongational flow that occurs when a fluid, e.g., a coating composition, is forced through an aperture of the applicator, such as the nip between rollers, the space between a blade and a substrate, or the orifice of a spray nozzle. The fluid is extended which results in an increase in viscosity as it approaches the aperture. Most viscometers, e.g., a Brookfield viscometer, impart rotational flow on the liquid whose viscosity is being measured and hence only measure rotational shear viscosity. Extensional viscosity is important when roller, blade or spray applicators are utilized because it can be as much as a 1000 times greater than the rotational shear viscosity.

The solids content of the aqueous coating composition utilized in this method is preferably in the range of about 30 to about 65 percent, most preferably about 35 to about 60 percent by weight based on the weight of the total composition.

After the complex hydrophobe associative thickener is admixed with the conventional aqueous composition the resultant coating composition is neutralized with an alkali such as ammonium, sodium or potassium hydroxide or an amine. Alternatively, the complex hydrophobe associative thickener can be neutralized before it is added to the conventional aqueous composition, as described herein above.

As used herein, the term "complex hydrophobe" is contemplated to include all permissible hydrocarbon compounds having 2 or more hydrophobe groups, e.g., bis-dodecylphenyl, bisnonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

EXAMPLES

A coating trial is conducted on a high speed off-machine pilot coater with application by short dwell blade using the paper coating formulations described below. The formulations are made by admixing the alkali-swellable complex hydrophobe thickener with the remaining ingredients and neutralizing with ammonia to pH 8.5. The paper being coated is light weight (23.5 lbs/ream basis weight) for use in rotogravure printing. In all runs, coating speed is constant at 4000 ft./min., with standard drying conditions used to maintain moisture in the coated sheet constant at 4–5%. Minor machine adjustments are made to apply the same coat weight of 5 lb./ream (5 lb./3,300 ft.).

| TABLE I | | | | |
|---|---|---|---|---|
| Run # | 1 | 2 | 3 | 4 |
| Run Code | A | B | C | D |
| Thickener Amount | 0.325 | 0.325 | 0.325 | 0.325 |
| Brookfield Viscosity | 6250 | 7300 | 4800 | 5500 |
| Blade Pressure (normalized to a Brookfield Viscosity of 6000) | 13.7/13.2 | 12.2/12.0 | 20.1/19.0 | 18.2/18.1 |

| Paper Coating Formulation II | | | |
|---|---|---|---|
| Component | Trade Name | Company | Parts |
| Delaminated Clay | Hydroprint | Huber | 67.5 |
| No. 2 Coating Clay | Hydraperse | Huber | 22.5 |
| Calcined Clay | Ansilex 93 | Englehard | 10.0 |
| Dispersant | Dispex N-40 | Allied Colloid | 0.25 |
| Alkali-Swellable | XU31066.50 | Dow | 6.5 |

TABLE I -continued

| Run # | 1 | 2 | 3 | 4 |
|---|---|---|---|---|
| Styrene/Butadiene Latex | | | | |
| DeFoamer | Foamaster 100 | Henkel | 0.10 | |
| Thickener | (see below) | (see below) | 0.10–0.15 | |

Paper Coating Formulation I

| Component | Trade Name | Company | Parts |
|---|---|---|---|
| Delaminated Clay | Hydroprint | Huber | 67.5 |
| No. 2 Coating Clay | Hydraperse | Huber | 22.5 |
| Calcined Clay | Ansilex 93 | Englehard | 10.0 |
| Dispersant | Dispex N-40 | Allied Colloid | 0.25 |
| Conventional Styrene/Butadiene Latex | XU31065.50 | Dow | 6.5 |
| DeFoamer | Foamaster 100 | Henkel | 0.10 |
| Thickener | (see below) | (see below) | 0.325 |

EXAMPLE I

Example I

| Run Code | Thickener Type | Trade Name | Company |
|---|---|---|---|
| A | Conventional Hydrophobe Associative | UCAR ® POLYPHOBE ® 206 | Union Carbide |
| B | Complex Hydrophobe Associative | UCAR ® POLYPHOBE ® 208 | Union Carbide |
| C | Conventional Hydrophobe Associative | ALCOGUM ® SL-78 | National Starch |
| D | Non-Associative | ALCOGUM ® L-98 | National Starch |

EXAMPLE II

| Run Code | Thickener Type | Trade Name | Company |
|---|---|---|---|
| E | Conventional Hydrophobe Associative | UCAR ® POLYPHOBE ® 206 | Union Carbide |
| F | Complex Hydrophobe Associative | UCAR ® POLYPHOBE ® 208 | Union Carbide |
| G | Conventional Hydrophobe Associative | ALCOGUM ® SL-78 | National Starch |
| H | Non-Associative | ALCOGUM ® L-98 | National Starch |

TABLE II

| Run # | 5 | 6 | 7 | 8 |
|---|---|---|---|---|
| Run Code | E | F | G | H |
| Thickener Amount | 0.10 | 0.10 | 0.10 | 0.15 |
| Brookfield Viscosity | 5600 | 5200 | 6500 | 5200 |
| Blade Pressure | 16.1/15.5 | 16.6/16.3 | 12.8/12.5 | 19.5/19.0 |

TABLE II-continued

| Run # | 5 | 6 | 7 | 8 |
|---|---|---|---|---|
| (normalized to a Brookfield Viscosity of 6000) | | | | |

Results show that overall, coating formulations made with a complex hydrophobe associative thickener are considered best based on efficiency, rheology, compatibility and visual observation on the coater. The complex hydrophobe associative thickener results in lower blade pressure at much higher viscosities when compared to both conventional hydrophobe associative thickeners and non-associative thickeners, when used with a conventional styrene/butadiene latex binder in an aqueous coating composition.

Although the invention has been illustrated by the preceding examples, it is not to be construed as being limited thereby; but rather, the invention encompasses the generic area as herein before disclosed. Various modifications and embodiments can be made without departing from the spirit and scope thereof.

We claim:

1. A method of coating a substrate comprising applying to a substrate an aqueous coating composition comprising an akali-swellable complex hydrophobe associative thickener, said complex hydrophobe associative thickener being prepared by polymerizing monomers comprising:

(a) about 1–99.9 weight percent of one or more alpha, beta-monoethylenically unsaturated carboxylic acids;

(b) about 0–98.9 weight percent of one or more monoethylenically unsaturated monomers;

(c) about 0.1–99 weight percent of one or more complex hydrophobe-containing monoethylenically unsaturated macromonomers; and (d) about 0–20 weight percent or greater of one or more polyethylenically unsaturated monomers: wherein said complex hydrophobe-containing monoethylenically unsaturated macromonomers is represented by the formula:

$$R^1-(OR^2)_z-R^3-\overset{R^4}{\underset{|}{C}}=CR^5R^6$$

wherein:

$R^1$ is a monovalent residue of a substituted or unsubstituted complex hydrophobe compound:

each $R^2$ is the same or different and is a substituted or unsubstituted divalent hydrocarbon residue:

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater; in which said substituted or unsubstituted complex hydrophobe compound is represented by the formula selected from;

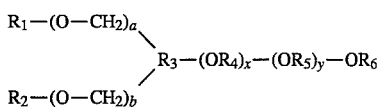

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

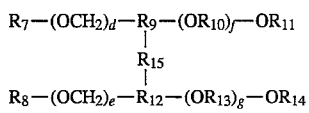

wherein $R_7$ and $R_8$ are the same or different and are hydrogen or a substituted or unsubstituted monovalent hydrocarbon residue, $R_9$, and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituteed or unsubstituted divalent hydrocarbon residue. $R_{11}$ and $R_{14}$ are the same or different and are hydrogen, a substituted or unsubstituted monovalent hydrocarbon residue or an ionic substituent. $R_{15}$ is a substituted or unsubstituted divalent hydrocarbon residue, d and e are the same or different and are a value of 0 or 1, and f and g are the same or different and are a value of or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

2. The method of claim 1 wherein the substrate is selected from the group consisting of paper, cardboard, films, yarns, fabrics and leather.

3. The method of claim I wherein said component (a) is methacrylic acid.

4. The method of claim I wherein said component (b) is ethyl acrylate.

5. The method of claim 1 wherein the complex hydrophobe compound has at least one of $R_1$, $R_2$, $R_7$ and $R_8$ as a hydrocarbon radical represented by the formula:

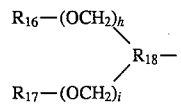

wherein $R_{16}$ and $R_{17}$ are the same or different and are hydrogen or a substituted or unsubstituted monovalent hydrocarbon residue, $R_{18}$ is a substituted or unsubstituted divalent or trivalent hydrocarbon residue, and h and i are the same or different and are a value of 0 or 1.

6. The method of claim 1 wherein the complex hydrophobe compound has at least one of $R_4$, $R_5$, $R_{10}$ and $R_{13}$ as a hydrocarbon radical represented by the formula:

$$-CH[(OR_{19})_jOR_{20}]-$$

wherein each $R_{19}$ is the same or different and is a substituted or unsubstituted divalent hydrocarbon residue, $R_{20}$ is hydrogen, a substituted or unsubstituted monovalent hydrocarbon residue or an ionic substituent, and j is a value of 0 or greater.

7. The method of claim 1 wherein the complex hydrophobe compound has each $R_4$, $R_5$, $R_{10}$ and $R_{13}$ selected from $-CH_2CH_2-$, $-CH_2CH(CH_3)-$ and mixtures thereof.

8. The method of claim 1 wherein the complex hydrophobe compound has $R_6$, $R_{11}$ and $R_{14}$ as hydrogen.

9. The method of claim 1 wherein the complex hydrophobe-containing macromonomer has values of x, y, f and g from 0 to about 200 or greater.

10. The method of claim 1 wherein the system is thickened further by the addition of an effective amount of surfactant, solvent or non-solvent.

11. The method of claim 1 wherein the monoethylenically unsaturated carboxylic acid is present in an amount in the range of about 10 to about 70 weight percent.

12. The, method of claim 1 wherein the monoethylenically unsaturated monomer is present in an amount in the range of about 30 to about 85 weight percent.

13. The method of claim 1 wherein the complex hydrophobe-containing monoethylenically unsaturated macromonomer is present in an amount in the range of about 5 to about 60 weight percent.

14. The method of claim 1 wherein the polyethylenically unsaturated monomer is present in an amount in the range of about 0 to about 10 weight percent.

15. A method of coating a substrate comprising applying to a substrate an aqueous coating composition comprising a styrene-butadiene latex binder and an alkali-swellable complex hydrophobe associative thickener being prepared by polymerizing monomers comprising:

(a) about 1–99.9 weight percent of one or more alpha, beta-monoethylenically unsaturated carboxylic acids;

(b) about 0–98.9 weight percent of one or more monoethylenically unsaturated monomers;

(c) about 0.1–99 weight percent of one or more complex hydrophobe-containing monoethylenically unsaturated macromonomers having the formula:

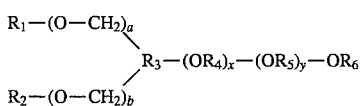

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and (d) about 0–20 weight percent or greater of one or more polyethylenically unsaturated monomers.

* * * * *